(12) United States Patent
Mueller et al.

(10) Patent No.: US 9,034,529 B2
(45) Date of Patent: May 19, 2015

(54) METHOD FOR OPERATION OF A FUEL CELL SYSTEM IN A VEHICLE

(75) Inventors: Helmut Mueller, Kirchheim (DE); Sven Schmalzriedt, Esslingen (DE); Klaus Weigele, Schlierbach (DE)

(73) Assignee: Daimler AG, Stuttgart (DE)

( * ) Notice: Subject to any disclaimer, the term of this patent is extended or adjusted under 35 U.S.C. 154(b) by 543 days.

(21) Appl. No.: 13/388,898

(22) PCT Filed: Jul. 19, 2010

(86) PCT No.: PCT/EP2010/004379
§ 371 (c)(1),
(2), (4) Date: Mar. 16, 2012

(87) PCT Pub. No.: WO2011/015282
PCT Pub. Date: Feb. 10, 2011

(65) Prior Publication Data
US 2012/0171585 A1     Jul. 5, 2012

(30) Foreign Application Priority Data

Aug. 5, 2009  (DE) .................. 10 2009 036 199

(51) Int. Cl.
*H01M 8/04*     (2006.01)
*H01M 8/10*     (2006.01)

(52) U.S. Cl.
CPC ...... *H01M 8/04097* (2013.01); *H01M 8/04111* (2013.01); *H01M 8/04753* (2013.01);
(Continued)

(58) Field of Classification Search
CPC .................. H01M 2250/20; H01M 8/04097; H01M 8/04111; H01M 8/04753; H01M 8/04776; H01M 8/0488; H01M 2008/1095; Y02E 60/50; Y02T 90/32

USPC .................. 492/414, 429; 429/414, 429
See application file for complete search history.

(56) References Cited

U.S. PATENT DOCUMENTS 6,484,075 B2   11/2002   Hasegawa et al.
7,482,074 B2    1/2009   Yoshida et al.
(Continued)

FOREIGN PATENT DOCUMENTS

DE   10 2008 015 344 A1   1/2009
JP       2003-168453 A    6/2003
(Continued)

OTHER PUBLICATIONS

International Search Report with English translation dated Oct. 29, 2010, including Form PCT/ISA/237 (thirteen (13) pages).
(Continued)

*Primary Examiner* — Milton I Cano
*Assistant Examiner* — Ling R Zeng
(74) *Attorney, Agent, or Firm* — Crowell & Moring LLP

(57) ABSTRACT

A method of operating a fuel cell system in a vehicle that is switchable to a temporary stop mode and restarted from the stop mode. When, in certain driving situations, it is required to switch to the stop mode, it is then checked whether the operating conditions of the fuel cell system allow a switch to the stop mode. If the switch is allowed it takes place. When a restart of the fuel cell system is required on the basis of the vehicle the settings of the stop mode are cancelled again. The switch to the stop mode involves, with further existing electric contacting of the fuel cell, the air mass flow conveyed by the air conveying device being switched off or reduced to a predefined value and the pressure of the combustion gas supplied being reduced to a predefined value.

14 Claims, 2 Drawing Sheets

Figure 1:
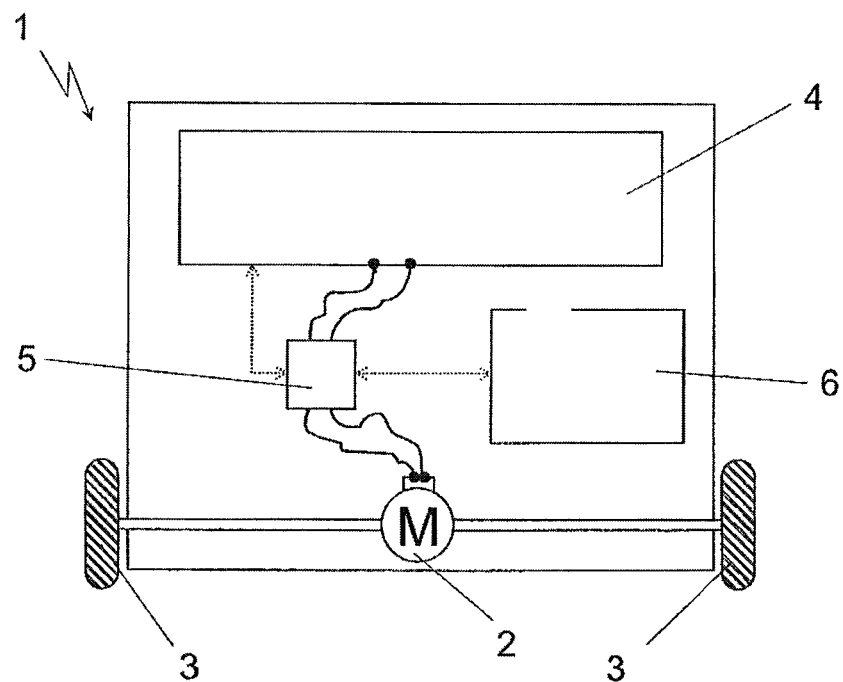

(52) U.S. Cl.
CPC ........ *H01M8/04776* (2013.01); *H01M 8/0488* (2013.01); *H01M 2008/1095* (2013.01); *H01M 2250/20* (2013.01); *Y02T 90/32* (2013.01); *Y02E 60/50* (2013.01)

(56) References Cited

U.S. PATENT DOCUMENTS

| | | | |
|---|---|---|---|
| 2001/0053950 | A1 | 12/2001 | Hasegawa et al. |
| 2002/0182456 | A1 | 12/2002 | Condit et al. |
| 2004/0150366 | A1* | 8/2004 | Ferrall et al. ................. 320/101 |
| 2005/0106429 | A1* | 5/2005 | Keefer ............................. 429/20 |
| 2005/0147862 | A1* | 7/2005 | Knoop et al. ................... 429/34 |
| 2005/0214604 | A1* | 9/2005 | Goto et al. ...................... 429/22 |
| 2007/0072023 | A1* | 3/2007 | Nakamura et al. ............. 429/22 |
| 2007/0077459 | A1* | 4/2007 | Walton et al. .................. 429/12 |
| 2007/0111058 | A1* | 5/2007 | Yoshida .......................... 429/22 |
| 2010/0203365 | A1 | 8/2010 | Konrad et al. |
| 2010/0203408 | A1 | 8/2010 | Ono et al. |
| 2011/0053015 | A1 | 3/2011 | Walz et al. |

FOREIGN PATENT DOCUMENTS

| | | |
|---|---|---|
| JP | 2003-208911 A | 7/2003 |
| JP | 2004-14159 A | 1/2004 |
| JP | 2004-172028 A | 6/2004 |
| JP | 2005-203263 A | 7/2005 |
| JP | 2006-134600 A | 5/2006 |
| JP | 2006-147486 A | 6/2006 |
| JP | 2006-309971 A | 11/2006 |
| JP | 2009-26736 A | 2/2009 |
| WO | WO 2006/117969 A1 | 11/2006 |
| WO | WO 2008/155629 A1 | 12/2008 |
| WO | WO 2009/018867 A1 | 2/2009 |

OTHER PUBLICATIONS

German Office Action dated Apr. 12, 2010 (three (3) pages).
Japanese-language Office Action Dated Aug. 21, 2013 (five (5) pages).
English-language translation of Chinese Office Action issued in Chinese Patent Application No. 201080034573.6 (four (4) pages).

* cited by examiner

METHOD FOR OPERATION OF A FUEL CELL SYSTEM IN A VEHICLE

BACKGROUND AND SUMMARY OF THE INVENTION

The invention relates to a method for operating a fuel cell system in a vehicle, and in particular to a method of operating a fuel cell system in which the fuel cell system is switchable into and out of a temporary stop mode.

Stop/start systems in vehicles are known from the general prior art, and are used for saving energy and reducing noise emissions by switching off the drive unit during short phases, in which no power is required, for example at a junction, a red traffic light or when the vehicle is rolling, in order to thus save energy. Typically, besides the drive unit itself, auxiliary consumers such as for example, pumps, compressors and the like are also switched off or at least brought into a state of reduced power. It is thus possible to clearly reduce both the energy requirement and the emission of harmful substances and noise.

Start/stop systems are also known in vehicles equipped with a fuel cell system for generating the necessary drive power. U.S. Pat. No. 6,484,075 B2 describes a method for placing a fuel cell temporarily in a stop mode for the duration of a vehicle stop. On the basis of a request of the vehicle to switch to a stop mode of the fuel cell system, first it is checked whether the fuel cell system is in a position to fulfill this request. Insofar as this is the case there is a switch to a stop mode, in which both the combustion gas supply and the air supply of the fuel cell are completely switched off. Energy and emissions are thereby saved. However, the method described therein has the significant disadvantage that through the constant switching on and off comparatively rapid ageing of the fuel cell arises and for a restart both of the hydrogen supply and the air supply from a complete standstill a comparatively long time is required, in which upon restart of the vehicle the fuel cell cannot supply any drive power.

Exemplary embodiments of the present invention are directed to methods for operating a fuel cell system in a vehicle that provides a more comfortable functionality during stop/start operation and simultaneously facilitates a long lifespan of the fuel cell.

Due to the fact that in the inventive method the electric contacting of the fuel cell is maintained with the switch to the stop mode it is furthermore possible for a current to be drawn from the fuel cell so that residual media, and here in particular residual oxygen, are removed in the region of the fuel cell. This avoids harmful voltages for the individual cells of the fuel cell during the stop mode, which would have a disadvantageous effect upon the lifespan of the fuel cell. In order to have a sufficient quantity of combustion gas, in particular hydrogen, available for the removal, the supply of the combustion gas to the anode side of the fuel cell is not interrupted in the inventive method but instead merely decreased to a reduced pressure. This prevents an excessively large differential pressure between the anode region and the cathode region with switched off or minimized air supply of the cathode region of the fuel cell. If the fuel cell—as is the case according to a particularly preferred further development—is formed as a PEM fuel cell this reduced pressure difference ensures that the membranes of the fuel cell are correspondingly spared and not loaded with too high a differential pressure.

According to a very favorable and advantageous further development of the inventive method combustion gas that is not consumed in the fuel cell system is fed from a region after the anode via a recirculation conveying device together with fresh combustion gas from the valve device to the combustion gas supply of the anode, wherein the switch to the stop mode further comprises the mass flow conveyed by the recirculation conveying device being reduced to a predefined value. During the stop mode, therefore, upon use in a fuel cell system with anode recirculation the recirculation conveying device continues to be operated. This can be formed according to a very advantageous further development as a recirculation fan driven by an electric motor. In this case the recirculation fan can be easily and efficiently brought to a predefined speed which is clearly lower than the speed in regular operation. Together with the negligibly maintained pressure and thus the negligible supply of hydrogen according to the inventive method such a structure is produced, wherein through the recirculation conveying device the gases continue to be moved in the region of the anode and the recirculation line so that oxygen possibly penetrating into the cathode region of the fuel cell can be correspondingly removed by loading the fuel cell with a current.

According to a very advantageous embodiment of the inventive method the fuel cell is electrically coupled to an electronic unit for removing the power of the fuel cell, through which excess power of the fuel cell is also stored in an energy storage device, whereby through the electronic unit after the switch to the stop mode an electric current is drawn from the fuel cell until a predefined voltage is reached and after which the fuel cell is kept regulated to a constant voltage. This very advantageous embodiment of the inventive method provides for the very frequent use of the fuel cell together with an energy storage device, such as a battery. In situations in which excess power of the fuel cell is available or in situations in which the vehicle is decelerated via the electric drive motor in generation operation, electric power that is produced in the system and not directly required can be intermediately stored. The structure now has the significant advantage that with the entry into the stop mode a current is removed through the electronic unit from the fuel cell. This current ensures that the voltage is kept correspondingly low and that therefore no corrosion arises in the region of the individual cells in the fuel cell. A favorable threshold for the voltage is approximately 0.85 Volt for each individual cell. By means of the current, residual oxygen situated in the cathode region is also removed as this can react with the combustion gas because the combustion gas supply according to the invention still continues at a low level. After the residual gases have been used up the voltage is held via the electronic unit at a predefined low level in order to also continue to maintain readiness for operation. In addition this low voltage level which typically then lies on the whole high voltage bus of the fuel cell system allows a reliable operation thereof as it is also responsible for example for the drive of the recirculation conveying device. It can thereby arise by all means that a negative current flows into the fuel cell, the power necessary for this can be removed from the energy storage device and is typically very low.

In a favorable further development of the inventive method the air conveying device is completely stopped upon switching to the stop mode. This structure can be realized very simply using volumetric compressors and the like, as these can restart very quickly and provide a maximum air flow, which is very favorable with regard to the noise emissions and the energy requirement.

Due to the oxygen supply of the cathode region that then no longer occurs, the voltages of the individual cells can further reduce and diverge. In order to also securely and reliably avoid in such cases a corrosion of the individual cells of the fuel cell it can be provided according to a very advantageous further development of the inventive method after the stop mode has lasted a predefined time span a temporary increase of the air mass flow is carried out, whereby after reaching a predefined value of the air mass flow there is a switch back to the stop mode. This short term running of the air conveying device temporarily produces an air mass flow into the cathode region of the fuel cell. With this so-called refresh there is then once again an increase in the voltage in the region of the fuel cell and thus a reduction in the risk of corrosion, as the mechanisms described at the start are used again. As merely the air mass flow is temporarily increased and the other processes and components remain in their state for the stop mode this refresh has a comparatively low energy requirement and only low noise emissions. However, it can also facilitate a considerable advantage having regard to corrosion and thus the lifespan of the fuel cell.

In a further very advantageous embodiment of the inventive method a flow compressor can be used as an air conveying device that continues to run during the stop mode at a predefined low speed. Flow compressors conveying the air mass flow for the fuel cell via a fan or similar are known from the general prior art in fuel cell systems and have corresponding advantages in relation to volumetric compressors. However, flow compressors require a comparatively high speed in order to be able to provide the required air mass flow. In a stop mode such a flow compressor is therefore not completely stopped but instead runs according to the invention at a low speed. This has the advantage that upon restart of the system it does not have to be so greatly accelerated, whereby this has considerable advantages in relation to the energy requirement and the time until restart of the fuel cell system. A further aspect of allowing the flow compressor to continue to run as an air conveying device at a low speed is that a low air mass flow continues to be conveyed to the fuel cell so that the abovementioned refresh can typically be omitted in this embodiment of the inventive method.

In a very favorable and advantageous further development of the inventive method it is now also provided that when switching to the stop mode between the air mass flow to the fuel cell after the air conveying device and an exhaust gas flow from the fuel cell system a flow connection is opened. Such a flow connection, which could also be described as a system bypass valve, thus creates a flow connection from a region after the air conveying device into the exhaust gas region. Without blocking off the cathode region of the fuel cell, which would necessitate very high-resource and expensive valve devices that are additionally prone to breakdown, very heavy and require a considerable construction space, it is thus possible with a single very simple valve to ensure that, for the possibly still conveyed air mass flow or the air mass flow built up through a build-up pressure for example during rolling down a hill of a vehicle, a path with a very low pressure loss is made available, via which a large part of the air mass flow can flow directly again away from the fuel cell system without previously passing the fuel cell. The quantity of oxygen conveyed into the fuel cell or its cathode chamber is thereby correspondingly reduced. It is nonetheless sufficient to prevent the abovementioned problems in relation to corrosion even without a refresh insofar as the air conveying device is formed as a flow compressor and continues to run at a low speed.

BRIEF DESCRIPTION OF THE DRAWING FIGURES

Figure 2:
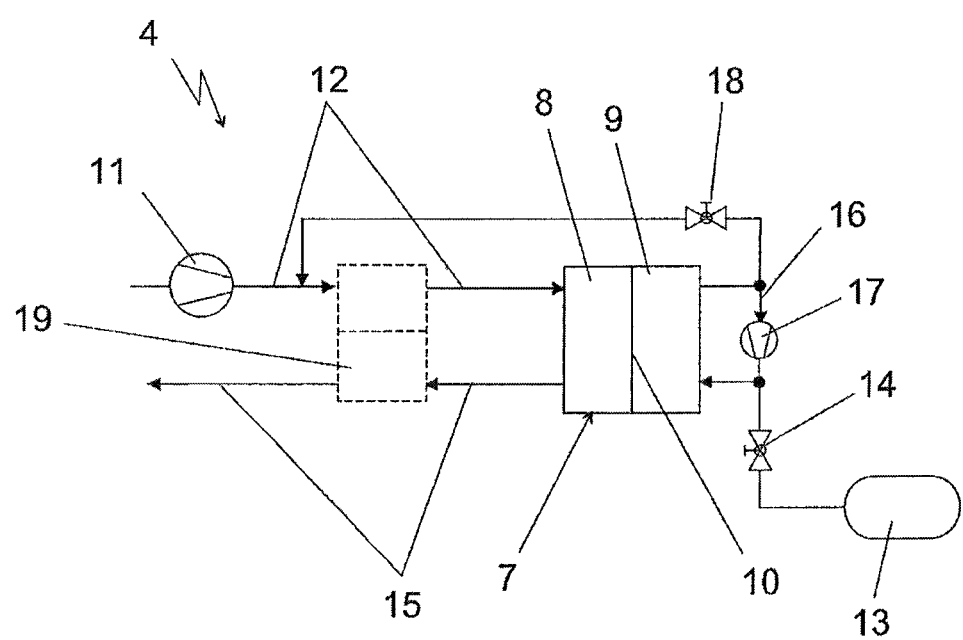

Further advantageous embodiments and developments of the inventive method follow from the remaining dependent sub-claims and will become clear by reference to the possible method sequences described below which are explained in greater detail by reference to the drawings, in which:

FIG. 1 shows a greatly schematized vehicle with a fuel cell system;

FIG. 2 a fuel cell system in a first possible embodiment; and

Figure 3:
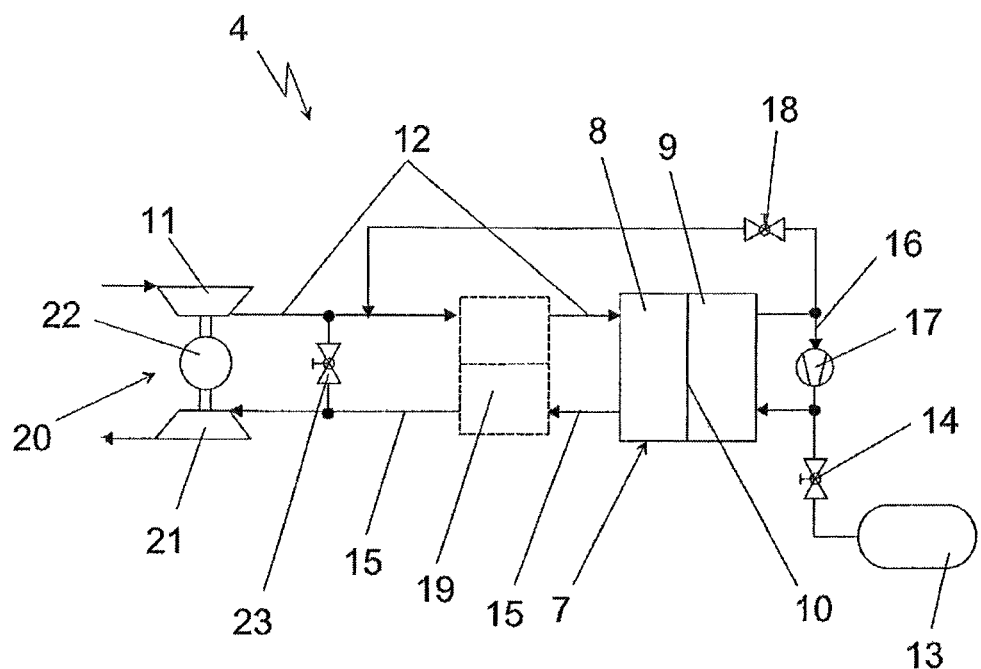

FIG. 3 a fuel cell system in a second possible embodiment.

DETAILED DESCRIPTION

FIG. 1 shows a vehicle 1 in a greatly schematized representation, which can be moved via an electric drive motor 2 that drives two wheels 3. The vehicle 1 has a fuel cell system 4 providing the electric drive energy for the motor 2 and thus ultimately for driving the vehicle 1. This is shown in FIG. 1 via electric lines which connect the fuel cell system 4 and the drive motor 2 via an electronic unit 5 to each other. As indicated through the dotted arrows, the electronic unit 5 is also in communication with the fuel cell system 4 in order to be able to inquire, for example, about values of sensors in the fuel cell system 4 monitoring it with regard to pressure, temperature and the like. The electronic unit 5 is also in corresponding connection with a vehicle control unit 6 that is provided in the known way for controlling the vehicle. This vehicle control unit 6 is also in connection via sensors and actuators (not shown here) with the vehicle 1 and can evaluate for example acceleration values, an accelerator pedal position as a reference for the power requirement desired by the driver and the like.

The vehicle in FIG. 1 has a so-called stop/start system. Such a stop/start system ensures that a drive unit of the vehicle 1, thus here the fuel cell system 4, always switches to a standby or stop mode when there is temporarily no power requirement upon the fuel cell system 4. This can be the case, for example, when stopping at traffic lights, when coasting to a stop or when going down a hill with a rolling vehicle 1. Due to the fact that the fuel cell system 4 then switches to the stop mode, in which it uses significantly less energy and causes lower emissions both of harmful substances and noise, such a stop/start system produces a highly energy-saving and comfortable vehicle 1.

Such stop/start systems with their advantages are thereby known from the general prior art both for vehicles with fuel cell systems and also vehicles with internal combustion engines.

In the illustration of FIG. 2 an exemplary fuel cell system 4 is shown in more detail. The core of the fuel cell system 4 is thereby formed by a fuel cell 7 which is to be constructed here as a stack of PEM fuel cells.

Corresponding to this mode of construction the fuel cell 7 comprises a cathode chamber 8 and an anode chamber 9 which are separated from each other through the proton conducting membranes 10. An air mass flow is made available to the cathode chamber 8 via an air conveying device 11, which is to be formed here as a volumetric compressor, for example as a screw or root compressor, via a feed air line 12. The oxygen contained in this air mass flow now reacts at least partially in the region of the fuel cell 7 with a combustion gas flow fed to the anode chamber 9 of the fuel cell 7. This combustion gas flow is to be a hydrogen flow in the exemplary embodiment shown here. This is made available to the anode chamber 9 of the fuel cell 7 from a storage device 13 via a valve device 14 at a controllably predefined pressure level. The storage device 13 is thereby formed in particular as a high pressure storage device, in which the hydrogen is stored at a very high pressure, for example 350 or 700 bar. Instead of using hydrogen stored under pressure it would obviously also be conceivable to use, instead of the storage device 13, a gas generation device, in which hydrogen is generated for example from a hydrocarbon containing starting substance.

The oxygen in the air mass flow and the hydrogen react with each other in the region of the fuel cell 7, whereby the electric power is produced that is then further used by means of the electronic unit 5 shown in FIG. 1. In addition, product water is produced in the region of the fuel cell 7, and here in particular in the region of the cathode chamber 8 of the fuel cell 7, which product water is removed with an exhaust gas flow via an exhaust gas line 15 from the cathode chamber 8.

In the anode chamber 9 of the fuel cell 7 the hydrogen is typically not completely converted as solely in order to supply all regions of the anode evenly with hydrogen a corresponding excess of hydrogen is dosed via the valve device 14 into the anode chamber 9. The unused hydrogen is recirculated via a recirculation line 16 and a recirculation conveying device 17 and arrives, with fresh hydrogen from the storage device 13, back in the anode chamber 9. The recirculation conveying device 17 is to be formed in the exemplary embodiment shown here as a hydrogen recirculation fan 17, which is driven by an electric motor.

Over time, inert gas enriches in the region of this anode recirculation, which inert gas is diffused through the membranes 10 from the region of the cathode chamber 8 into the anode chamber 9. In addition a part of the product water is produced in the anode chamber 9. In order to be able to remove this water and the inert gas from time to time from the anode recirculation a valve 18 is provided in the exemplary embodiment of the fuel cell system 4 shown here, via which water and/or gas can be removed discontinuously from time to time from the region of the anode recirculation. Instead of the one valve 18 shown here, which is used as a combined valve for the so-called drain (the removal of water) and the purge (the removal of gas), two valves could be provided for the removal of water and the removal of gas. In a preferred variant, however, these two functionalities can be brought together in the valve 18 which is arranged for this purpose preferably in a water separator (not illustrated). The water and/or gas removed via the valve 18 then arrives in the region of the feed air line 12 in order to arrive together with the feed air conveyed via the air conveying device 11 in the cathode chamber 8. In the cathode chamber 8, residual hydrogen remaining in the gas expelled via the valve 18 is converted on the electric catalysts there with the oxygen of the air so that no hydrogen emissions come from the fuel cell system 4. The water input is evaporated in the dry feed air that is hot after the air conveying device 11 and moistens it. Excess water is expelled together with the product water via the exhaust gas line 15.

In FIG. 2 an optional humidifier 19 can be seen. A humidifier 19 can include, for example, membranes that are permeable to water vapor but impermeable for air and exhaust gas. On one side of the membranes the air mass flow now flows in the feed air line 12 while on the other side of the membranes the moist exhaust gas flow loaded with the product water flows in the exhaust gas line 15. A humidity compensation between the individual mass flows thereby arises so that the feed air which is typically hot and dry after the air conveying device 11 is moistened through the product water in the exhaust gas flow. The thus cooled and moistened feed air is much better tolerable for the membranes 10 than a non-moistened air. Depending upon the use of membrane material and temperature level, however, the humidifier 19 which is optionally shown here can also be omitted.

As already mentioned, the vehicle 1 does not require any power to advance in certain situations. In these situations, by means of the vehicle control unit 6 a request for a switch to the stop mode can arise. By means of a control device, which can for example be part of the electronic unit 5, the fuel cell system 4 is now checked to ascertain whether the present operating states, temperatures and pressures allow the switch to such a stop mode. If this is not the case the fuel cell system is for now further operated until corresponding operating conditions are present which allow such a switch.

In the typically much more frequently arising case that the fuel cell system 4 is ready to switch to the stop mode such a switch takes place. During such a stop mode the fuel cell system 4 does not supply any energy for the vehicle 1, but remains—in contrast with a definitive disconnection of the fuel cell system 4 and the vehicle 1—in a mode from which a restart is possible in a very short time span, in particular in significantly less than one second. The fuel cell 7 remains in electric contact with the electronic unit 5. It is therefore not electrically disconnected. If it is a matter of a fuel cell system according to FIG. 2 the air conveying device is stopped, the pressure supply of the anode chamber 9 with hydrogen is reduced to a low pressure level. The recirculation conveying device 17 continues to be operated but with a much lower mass flow. This can take place through a reduction in the speed of the recirculation conveying device 17 formed as a hydrogen recirculation fan in this exemplary embodiment. As no further air mass flow is available through the feed air line 12 the valve 18 must also remain closed in each case during the stop mode, even if it should be opened, for example due to a time control during a stop mode for the drain and/or the purge of water and/or gas. The control for the stop mode must thus have corresponding precedence here so that the valve 18 remains closed for the duration of the stop mode in any case. Because only a minimal current or no current at all is drawn from the fuel cell 7 during the stop mode, an increase in the hydrogen pressure in the anode chamber 9 can arise. This pressure must thus be correspondingly monitored and regulated to a predefined pressure window or a predefined low pressure level. Such a pressure level could lie for example between 0.03 bar as a minimum hydrogen pressure and 0.6 bar as a maximum hydrogen pressure.

Due to the remaining air supply of the cathode chamber 8 there is no overpressure or only a minimal overpressure here so that the hydrogen pressure must be limited solely in order to avoid excessively loading the membranes 10.

At the start of the stop mode there is still residual oxygen in the cathode chamber 8. A negligible current flow will thus arise. While this current flows and the residual oxygen is consumed in the cathode chamber 8 the voltage of the fuel cell 7 will fall correspondingly. The residual oxygen in the cathode chamber 8 is thereby consumed, the current can for example be used in an end plate heater of the fuel cell 7 or in other auxiliary consumers. In addition penetration of hydrogen into the cathode chamber 8 will arise through a hydrogen permeation through the membranes 10 or slight leakages. This hydrogen reacts with the oxygen.

In the subsequent phase of the stop mode a constant voltage is maintained in order to ensure that the high voltage bus of the fuel cell system 4 is supplied with a voltage that also continues to guarantee a functionality of the high voltage bus and that is necessary, for example, for the drive of the recirculation conveying device 17. In addition, by holding the voltage constant, for example at a level of up to 0.85 Volt for each individual cell, the likelihood of the individual cells of the fuel cell stack 7 being affected by corrosion is reduced. The voltage can thereby be kept at this constant level by means of the electronic unit 5, which comprises for example a DC/DC converter. After the oxygen has been completely consumed in the cathode chamber 8 a negligible current flow into the fuel cell 7 is necessary to maintain this minimal voltage. The power necessary for this can be provided from an energy storage device which is typically provided in the vehicle 1. Such an energy storage device, which can, for example, be a battery or a high power capacitor or also a combination of these structural elements, is typically present in electrically driven vehicles 1. If there is a power excess in the region of the fuel cell system 4 excess power can be intermediately stored in this energy storage device. Also during deceleration of the vehicle 1 power can be obtained in that a large part of the braking moment is applied not via friction brakes but instead via a generation operation of the drive motor 2. The electric energy recovered in this way can also be stored in the energy storage device and be used for example for a further restart.

The energy storage device is thus in a position in such a vehicle 1, even without the fuel cell system 4 being operated or actively emitting power, to provide an at least low quantity of power. This suffices in order to keep the voltage constant in the region of the fuel cell stack 7. It is thereby to be ensured that the individual cells of the fuel cell 7 tolerate a slight negative current without this having a negative effect upon their performance and lifespan.

If the stop mode lasts longer it can arise that the voltages on the individual cells of the fuel cell 7 begin to diverge. As there is typically control only on the overall voltage of the stack, thus of the stack of the individual cells in the fuel cell 7, individual cells can then have voltages that are critical with regard to corrosion for this individual cell. It can thus be provided that after a predefined time span, which lies for example here between approximately 7 and 15 minutes, preferably approximately 10 minutes, a so-called refresh of the fuel cell system 4 takes place. Such a refresh provides that the air conveying device 11 is correspondingly increased until a predefined air mass flow, for example in the magnitude of approximately 25 kg/second, is achieved. After this air mass flow has been reached the fuel cell system 4 switches back to the stop mode, which in the end only means here that the air conveying device 11 is stopped again, as the other conditions remain in the stop mode. Due to the proportion of oxygen now present again in the cathode chamber 8 a current can again be drawn from the fuel cell 7 until the voltage has fallen back to the low predefined level again, at which it is then regulated correspondingly through the electronic unit 5. The time period thus begins until the cell voltages again diverge so much that individual cells reach a critical state. Should the stop mode last more than two time spans a second refresh arises after renewed expiry of the time span. If the stop mode also continues to be maintained, a third refresh can take place, whereby typically after the expiry of a predefined time there is a switch from the stop mode into the permanently switched off mode of the fuel cell system 4. Such a predefined time can thereby lie typically in the magnitude of 2 to 3 of the time spans until a refresh.

FIG. 3 shows an alternative fuel cell system 4 that has a similar construction to the fuel cell system 4 shown in FIG. 2. The air conveying device 11 is formed in the embodiment of the fuel cell system 4 shown here as a flow compressor. The air conveying device 11 is thereby to be part of a so-called electric turbocharger 20 which comprises, besides the flow compressor 11, also a turbine 21 and an electric unit 22. The structure of the electric turbocharger 20, which is also referred to as an ETC, is thereby known in principle from the prior art. The air conveyance to the fuel cell 7 takes place via the flow compressor 11, which is driven as required by the electric unit 22. By means of the turbine 21 the exhaust gas coming from the cathode chamber 8 via the exhaust gas line 15 is also expanded so that the energy recovered from the exhaust gas flow can also be made available to the flow compressor 11. If, in special situations and operating states of the fuel cell system 4, there is a very low energy requirement of the flow compressor 11 it is possible for more power to be provided at the turbine 21 than is required by the flow compressor 11. In this case the electric unit 22 can be operated as a generator in order to store this power in the abovementioned energy storage device.

The switch to the stop mode functions in an essentially comparable manner in the fuel cell system 4 shown in FIG. 3 to the fuel cell system 4 already explained within the scope of FIG. 2. Due to the fact that the electric turbocharger runs in regular operation at very high speeds of typically way beyond 50,000 RPM the deceleration of the electric turbocharger to a speed of 0 and the restart from standstill require comparatively high resources, requiring in particular very much time. For this reason, when switching to the stop mode, insofar as an electric turbocharger or a flow compressor 11 is used as an air conveying device, this is not completely stopped but instead runs at a correspondingly predefined minimum speed in the magnitude of 10-12,000 RPM. A low air mass flow is thus also conveyed into the cathode chamber 8 in the stop mode. This ensures that a low current must constantly be drawn from the fuel cell 7 in order to correspondingly limit the voltage. This current can, however, also be used to drive the recirculation conveying device 17 to that there is hereby no unused electric energy. In addition, due to the constant negligible air supply to the anode chamber, the abovementioned refresh can be omitted in the fuel cell system 4 described here.

In order to still keep the air quantity reaching the cathode chamber 8 as low as possible the feed air line 12 and the exhaust gas line 15 after the air conveying device 11 are connected in terms of flow. In the fuel cell system 4 shown in FIG. 3 a system bypass valve 23 serves for this purpose, which provides a connection with very low pressure loss for the conveyed air mass flow. Without having to shut off the cathode chamber 8 with high-resource and expensive valve devices it is thus ensured that the largest air mass flow caused by allowing the air conveying device to run at low speed is blown out once again to the environment by the system bypass valve 23, whereby a part of the energy used for compression can be recovered via the turbine 21. Merely a very small proportion of the volume flow will follow the path of the somewhat higher pressure loss and flow through the cathode chamber 8. This portion is sufficient, however, to guarantee the operational readiness of the fuel cell 7 without a refresh and also over a longer period of time without disadvantages concerning the lifespan of the fuel cell 7 having to be feared.

Even without using the electric turbocharger 20, both during use of a flow compressor or also a volumetric compressor as an air conveying device the system bypass valve 23 can be provided. It can not only convey actively further conveyed air mass flows extensively without passage of the cathode chamber 8 around the system but can instead also correspondingly carry away an air mass flow that penetrates, for example, due to a build-up pressure into the feed air line 12, for example during rolling down hill of the vehicle 1.

The inventive method for realizing a stop/start operation for a vehicle 1 with a fuel cell system 4 thus facilitates the advantages of the stop/start operation without having to unnecessarily burden the fuel cell 7 having regard to its lifespan. Through the target standby with continued electric contact of the fuel cell 7 and negligibly maintained pressure of the hydrogen, with simultaneously continuing recirculation conveying device 17 and in case of a flow compressor negligibly continuing flow compressor 11, it facilitates an extremely fast restart of the fuel cell system in the magnitude of a few 100 ms. This structure can be ideally used for vehicles 1 which, in spite of frequent start and stop phases, are to facilitate for their user a safe, reliable and extraordinarily comfortable operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a fuel cell system in a vehicle, the method comprising:
    switching the fuel cell system to a temporary stop mode; and
    restarting the fuel cell from the temporary stop mode,
    wherein the fuel cell system comprises at least one fuel cell supplied on a cathode side via an air conveying device with an air mass flow and on an anode side via a device for combustion gas supply with a combustion gas mass flow, wherein on the basis of the vehicle in certain driving situations a requirement for a switch to the stop mode arises,
    wherein it is determined whether current operating conditions of the fuel cell system allow a switch to the stop mode, wherein if the switch to the stop mode is allowed said switch takes place, and wherein the settings of the stop mode are cancelled again if a restart of the fuel cell system is required,
    wherein operation in the stop mode involves, with continued electric contacting of the fuel cell, drawing current from the fuel cell, the air mass flow conveyed by the air conveying device being stopped or reduced to a predefined value and a pressure of the combustion gas supplied being reduced to a predefined value without interrupting the combustion gas supply, and
    wherein upon switching to the stop mode a flow connection is opened between the air mass flow to the fuel cell after the air conveying device and an exhaust gas flow from the fuel cell system.

2. The method according to claim 1, wherein combustion gas that is not consumed in the fuel cell system is fed again from a region after the anode via a recirculation conveying device together with fresh combustion gas from a valve device to the combustion gas supply of the anode, wherein the switch to the stop mode further involves the mass flow conveyed by the recirculation conveying device being reduced to a predefined value.

3. The method according to claim 1, wherein the recirculation conveying device is a fan driven by an electric motor, wherein the fan continues to run at a predefined low speed during the stop mode.

4. The method according to claim 1, wherein the pressure of the combustion gas is regulated to a predefined value range.

5. The method according to claim 1, wherein the fuel cell is electrically coupled to an electronic unit for removal of the power of the fuel cell, through which excess power of the fuel cell is also stored in an energy storage device, wherein after the switch to the stop mode an electric current is drawn from the fuel cell by the electronic unit until a predefined voltage is reached, after which the fuel cell continues to be regulated to a constant voltage.

6. The method according to claim 1, wherein the air conveying device is stopped upon switching to the stop mode.

7. The method according claim 1, wherein after the stop mode has lasted a predefined time span, a temporary increase in the air mass flow is performed, wherein after reaching a predefined value of the air mass flow there is a switch back to the stop mode.

8. The method according to claim 7, wherein the time span is predefined in a range of from 7 to 15 minutes.

9. The method according to claim 1, wherein the air conveying device is a flow compressor that continues to run at a predefined low speed during the stop mode.

10. The method according to claim 9, wherein the flow compressor is an electric turbocharger.

11. The method according to claim 10, wherein the predefined low speed is predefined to be less than 15,000 RPM.

12. The method according to claim 11, wherein the predefined low speed is predefined to be less than 12,000 RPM.

13. The method according to claim 1, wherein at least one line with a valve for discontinuous drainage of water or gas from the region of the anode recirculation into the region of the air mass flow flowing to the fuel cell leads from the region of the anode recirculation, wherein during the stop mode the at least one valve is kept closed.

14. The method according to claim 1, wherein the fuel cell is a PEM fuel cell and is operated with hydrogen as a combustion gas.

* * * * *